UNITED STATES PATENT OFFICE 2,374,620

TREATMENT OF FERMENTABLE MATTER

Martin V. H. Prinz, Omaha, Nebr.

No Drawing. Application March 13, 1944, Serial No. 526,326. In Canada December 31, 1941

8 Claims. (Cl. 99—150.1)

It is known that the monohalogen-acetic-acids and their derivatives (alcohol esters, aldehydes, ketones, etc.) inhibit the growth of certain microorganisms even at very low concentrations. Efforts have been made to utilize this inhibitory effect for preventing or controlling fermentation by yeasts. The compounds used include esters of the monohalogen acetic acids with aliphatic alcohols, aromatic alcohols and polyalcohols. All the compounds tried, however, have proved impracticable for the stabilization of fermentable foods and beverages on an industrial scale; the compounds with a low molecular weight have a very disagreeable smell and a powerful irritating effect on the mucous membranes, even in very great dilution, while those with a higher molecular weight, which lack this effect, are practically insoluble in water.

According to the present invention, the aforesaid inhibition of the growth of the said microorganisms is effected with the aid of a group of compounds which shows none of these disadvantages, namely, the esters of the monohalogen-acetic acids or α-monohalogen-substituted homologs thereof with monohydroxy or polyhydroxy aliphatic carboxylic acids. These compounds are easily soluble in water, have only a moderate odor in concentrated solution, and neither odor nor taste nor an irritating effect on the mucous membranes in those concentrations in which they are practically applied. Their inhibitory effect on fermentation, particularly by yeasts, is at least as strong as that of the above mentioned compounds. Besides they accelerate the sedimentation of suspended organic matter in liquids, even if this matter is colloidally dispersed, and also accelerate the development of flavoring substances which normally takes a considerable time. Thus the time necessary for processing and storage is appreciably shortened, less labor and machinery is required, and a better product is obtained than by the methods now in use.

More specifically stated, the preferred inhibitors according to the present invention are, from the chemical standpoint, esters of monohalogen-acetic acids ($CH_2X$—COOH, wherein X represents Cl, Br or I) with aliphatic hydroxy carboxylic acids which contain in their molecule one or more OH— groups and one or more COOH— groups, one or more of the OH— groups being esterified with the COOH— groups of a corresponding number of molecules of monohalogen-acetic acid. In tartaric acid, for instance, which has the formula HOOC—CHOH—CHOH—COOH, either one or both OH— groups may be replaced by the monohalogen-acetic acid radical

giving compounds of the formulae

HOOC—CH—O—(CO—CH$_2$X)—CHOH—COOH

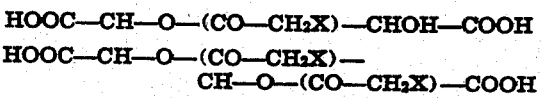

In this example, either compound alone may be used for the purpose of this invention as well as mixtures of both compounds. In general, mixtures containing esters of one or several different monohalogen-acetic acids with one or several different hydroxy-acids may also be used. As above indicated, the esters of the monohalogen-acetic acids may be severally replaced by an homolog thereof, provided only that it contains the halogen atom in α-position to the carboxyl group. In the following all these compounds or mixtures of compounds are designated briefly as "esters."

For treating fermentable matter the "esters" are used in concentrations varying between 20 parts per million and 400 parts per million by weight. The necessary concentration depends upon (a) the particular compound or mixture of compounds used, (b) the kind of fermentable matter to be treated and (c) the conditions under which the material is treated and stored. The lowest concentration which will produce the desired effect under the prevailing conditions has to be determined by experience, but some general rules may be stated:

1. Clear liquids require a lower concentration of the "esters" than material containing solid matter.

2. Materials containing substances which are unfavorable to the growth of micro-organisms (such as alcohol, high concentrations of sugar or salt, preservatives) require a lower concentration of the "esters" than those which do not contain such substances.

3. Materials which are to be stored at low temperatures and/or under exclusion of air required a lower concentration of the "esters" than those to be stored at normal temperatures and/or under access of air.

Thus, with a presently preferred "ester" (the mono-brom-acetic acid ester of lactic acid), the desired stabilization against undesired fermentation and other kinds of bacterial decomposition, may be realized with a concentration as low as 40 P. P. M.

"The "esters" are applied by mixing them thoroughly with the material which is to be treated. If the latter material is a liquid, the "esters" are dissolved in a small part of this liquid and this solution then mixed with the bulk. If the material consists of solid matter covered by a liquid, the "esters" are dissolved in a part of this liquid and this solution then mixed with the bulk of the material. Solid matter not covered by a liquid is moistened with a solution of the "esters" in water, sugar-syrup, brine, or any other liquid; the absorption of this solution may be enhanced by the application of heat, or vacuum, or increased pressure, as the case may be. The quantity of "esters" applied to each batch of material is calculated on the total weight of the material, whether liquid or solid or both.

Among the fermentable materials which can be successfully treated with the "esters" are the following:

1. Fruit juices, such as apple juice, grape juice, orange juice, etc.
2. Vegetable juices, such as tomato juice, carrot juice, etc.
3. Partly fermented fruit and vegetable juices, such as apple cider, fruit wines, sauerkraut juice, etc.
4. Fermented beverages, such as wine, beer, etc.
5. Mixtures of the above named products and/or other ingredients with milk or cream, such as milk-cocktails, ice cream, etc.

All these products listed in points 1 to 5 may be either still or carbonated.

6. Whole fresh fruit, of small size, not having a thick skin or peel, such as strawberries, raspberries, etc.
7. Fresh fruit which is crushed, cubed, sliced or otherwise processed, such as peaches, pears, pineapples, etc.
8. Fresh vegetables, whole, sliced, crushed or otherwise processed, such as tomatoes, cucumbers, etc.

All these products may be either covered with water or with a solution containing sugar, salt, vinegar, and/or any other like material.

9. Fermentable matter of any other kind, liquid, pulped, crushed, or in any other form, for use as food or in industry (e. g. pharmaceuticals) or in agriculture.

In the following I am giving some examples of how these products are treated. The "ester" used in all these examples is the ester of monobromacetic acid with lactic acid, having the formula $CH_2Br-CO-O-CH(CH_3)-COOH$.

1. Apple juice

The juice is prepared in the usual manner by pressing. In 50 lbs. of juice, collected as running from the press, 4 ozs. of "ester" are dissolved. This solution is then poured into a container with a capacity of 5000 lbs. which is then filled with juice. To prevent the unfavorable influence of oxygen on the flavor and the color of the juice, it is advisable to leave as small an airspace as possible above the surface of the juice and to close the container tightly. Wherever feasible, the juice should be de-aerated and/or stored in an inert gas atmosphere, such as nitrogen or carbon dioxide. Within a very short time all suspended matter will have settled to the bottom of the container. At any time thereafter clear juice may be drawn from the container, either to be transferred to another storage vessel or to be filled in bottles, cans, barrels or other containers for sale or further processing. Preferably, this should be done under exclusion of air. If a particularly brilliant juice is required, drawing through a filter is advisable. Thus prepared, the juice will retain its full natural flavor and vitamin content and will be superior in quality to juice prepared by any other method.

2. Wine

The wine is prepared as usual. When the fermenting must has nearly attained the desired alcohol-content, the bulk of the yeast is removed by centrifuge or crude filtration, 2½ ozs. of "ester" are dissolved in 50 lbs. of the must, the solution poured into a storage vessel of a capacity of 5000 lbs. and the vessel then filled with must and closed suitably with a valve that will release excess pressure. After this treatment the alcohol content will not increase by more than 1% by volume. Within 2–3 weeks the must will have clarified and acquired the characteristic flavor of matured wine. At any time thereafter it may be filtered into bottles or casks, ready for consumption. This treatment saves a great deal of labor and cost usually spent for fining and repeated filtration.

3. Fruit

The fruit is washed and placed in jars or cans or other suitable containers, small fruit, such as berries, remaining whole, larger fruit, such as peaches or pineapples, being peeled and cut into suitable pieces. The undesirable parts, such as stones or cores, are removed. For 500 lbs. of fruit a sugar solution is made from 250 lbs. of sugar in 250 lbs. of water. (Less sugar may be used, according to taste, or even pure water, the total quantity of liquid plus fruit always being 1000 lbs.) 1½ ozs. of "ester" are dissolved in the liquid which is then poured into the containers, filling them right to the top. The airspace above the surface should be as small as possible, and, wherever feasible, the air should be removed altogether. The containers are tightly closed and, during the next two weeks, they should be turned over or slightly shaken every second day in order to ensure an even distribution and penetration of the sugar and "ester" throughout the liquid and the solid matter. Thus prepared the fruit will retain its full natural flavor and vitamin-content, at a considerable saving in processing cost.

4. Tomato-salad 1000 lbs. of firm, ripe tomatoes are washed with cold water, drained and sliced. The slices are placed in jars, cans or other suitable containers. In 700 lbs. of a solution, containing water, sugar, vinegar, spices and other ingredients in suitable proportion, 3 ozs. of "ester" are dissolved, and this solution is poured over the sliced tomatoes, filling the containers right to the top. The airspace above the surface should be as small as possible and, if feasible, the air should be removed altogether. The containers are tightly closed and, for the next two weeks, they are turned over or slightly shaken every second day in order to ensure an even distribution and penetration of the solution throughout the solid matter. The product is equivalent in flavor and vitamin-content to freshly prepared tomato-salad, but during the greater part of the year it will be cheaper than fresh tomatoes since it can be prepared in the season when tomatoes are abundant.

5. Animal feed 1000 lbs. of animal feed mash are prepared as usual and, when finished, are mixed with a solution of 1 oz. of "ester" in 10 lbs. of water and thoroughly stirred. Stored in suitable containers, the product will keep for a considerable time, thus saving the labor of preparing it fresh at short intervals. In full and tightly closed containers, stored at low temperature, it will keep longer than in open containers and/or at a higher temperature.

The monobromacetic acid ester of lactic acid, used by way of illustration in the foregoing examples, may be replaced, without prejudicing the results obtained, by adequate quantities of other "esters," e. g.:

Monochloracetic acid ester of lactic acid,
Monoiodoacetic acid ester of lactic acid,
Monochloracetic acid ester of citric acid,
Monobromacetic acid ester of citric acid,
Monoiodoacetic acid ester of citric acid,
Monochloracetic acid ester of tartaric acid,
Monobromacetic acid ester of tartaric acid,
Monoiodoacetic acid ester of tartaric acid,
(Bis-) monochloracetic acid ester of tartaric acid,
(Bis-) monobromacetic acid ester of tartaric acid,
(Bis-) monoiodoacetic acid ester of tartaric acid,
And others.

Having thus described my invention, what I claim is:

1. The method of processing edible material which contains a fermentable ingredient to produce a product which is stabilized against undesired fermentation and bacterial decomposition, which comprises subjecting the material, while in intimate admixture therewith, to the action of a member of the group consisting of the monohalogen-acetic acid esters of a monohydroxy aliphatic carboxylic acid, the monohalogen-acetic acid esters of a polyhydroxy aliphatic carboxylic acid, and mixtures of the said esters.

2. The method of processing fruit or vegetable juice to produce a product which is stabilized against undesired fermentation and bacterial decomposition, which comprises incorporating into the juice a small quantity of a member of the group consisting of the monohalogen-acetic acid esters of a monohydroxy aliphatic carboxylic acid, the monohalogen-acetic acid esters of a polyhydroxy aliphatic carboxylic acid, and mixtures of the said esters, and then effecting uniform distribution of the said member through the said juice.

3. The method of processing fermented liquid to produce a product which is stabilized against undesired fermentation and bacterial decomposition, which comprises incorporating into the liquid a small quantity of a member of the group consisting of the monohalogen-acetic acid esters of a monohydroxy aliphatic carboxylic acid, the monohalogen-acetic acid esters of a polyhydroxy aliphatic carboxylic acid, and mixtures of the said esters, and then effecting uniform distribution of the said member through the said liquid.

4. The method of processing fruit or vegetables to produce a product which is stabilized against undesired fermentation and bacterial decomposition, which comprises immersing the material being treated in a solution containing a small quantity of a member of the group consisting of the monohalogen-acetic acid esters of a monohydroxy aliphatic carboxylic acid, the monohalogen-acetic acid esters of a polyhydroxy aliphatic carboxylic acid, and mixtures of the said esters.

5. A composition of matter which is stabilized against undesired fermentation and bacterial decomposition, comprising edible material which contains a fermentable ingredient, and a small quantity of a member of the group consisting of the monohalogen-acetic acid esters of a monohydroxy aliphatic carboxylic acid, the monohalogen-acetic acid esters of a polyhydroxy aliphatic carboxylic acid, and mixtures of the said esters.

6. A composition of matter which is stabilized against undesired fermentation and bacterial decomposition, comprising fruit or vegetable juice and a small quantity of a member of the group consisting of the monohalogen-acetic acid esters of a monohydroxy aliphatic carboxylic acid, the monohalogen-acetic acid esters of a polyhydroxy aliphatic carboxylic acid, and mixtures of the said esters.

7. A composition of matter which is stabilized against undesired fermentation and bacterial decomposition, comprising a fermented liquid and a small quantity of a member of the group consisting of the monohalogen-acetic acid esters of a monohydroxy aliphatic carboxylic acid, the monohalogen-acetic acid esters of a polyhydroxy aliphatic carboxylic acid, and mixtures of the said esters.

8. A composition of matter which is stabilized against undesired fermentation and bacterial decomposition, comprising a fruit or vegetable and a small quantity of a member of the group consisting of the monohalogen-acetic acid esters of a monohydroxy aliphatic carboxylic acid, the monohalogen-acetic acid esters of a polyhydroxy aliphatic carboxylic acid, and mixtures of the said esters.

MARTIN V. H. PRINZ.